(12) United States Patent
Kappertz et al.

(10) Patent No.: US 7,650,796 B2
(45) Date of Patent: Jan. 26, 2010

(54) APPARATUS FOR MEASURING AND/OR MONITORING FLOW OF A MEDIUM

(75) Inventors: Fred Kappertz, Hochwald (CH); Thomas Küng, Basel (CH); Günther Bähr, Basel (CH)

(73) Assignee: Endress + Hauser Flowtec, Reinach (CH)

( * ) Notice: Subject to any disclaimer, the term of this patent is extended or adjusted under 35 U.S.C. 154(b) by 126 days.

(21) Appl. No.: 10/593,782

(22) PCT Filed: Mar. 21, 2005

(86) PCT No.: PCT/EP2005/051307

§ 371 (c)(1),
(2), (4) Date: Aug. 11, 2008

(87) PCT Pub. No.: WO2005/093376

PCT Pub. Date: Oct. 6, 2005

(65) Prior Publication Data

US 2008/0295608 A1 Dec. 4, 2008

(30) Foreign Application Priority Data

Mar. 22, 2004 (DE) .................. 10 2004 014 300

(51) Int. Cl.
*G01F 1/58* (2006.01)
(52) U.S. Cl. .................................... 73/861.12
(58) Field of Classification Search ........... 73/861.12, 73/861.16, 861.11; 702/50, 45
See application file for complete search history.

(56) References Cited

U.S. PATENT DOCUMENTS

| 4,346,604 | A | 8/1982 | Snook |
| 4,428,241 | A | 1/1984 | Davis et al. |
| 4,681,467 | A | 7/1987 | Karidis |
| 5,750,902 | A * | 5/1998 | Schwiderski ............. 73/861.12 |
| 7,369,949 | B2 * | 5/2008 | Yamamoto ................... 702/45 |
| 7,487,052 | B2 * | 2/2009 | Yamamoto ................... 702/50 |

FOREIGN PATENT DOCUMENTS

| DE | 1 944 952 | 3/1970 |
| DE | 33 29 689 A1 | 3/1984 |
| DE | 3435910 C2 | 4/1986 |
| DE | 195 35 998 A1 | 4/1997 |
| GB | 1206953 | 9/1970 |
| JP | 05 07 2008 | 3/1993 |
| JP | 05 10 7091 | 4/1993 |
| JP | 05107091 | 4/1993 |
| JP | 05 072008 A | 7/1993 |

* cited by examiner

*Primary Examiner*—Jewel Thompson
(74) *Attorney, Agent, or Firm*—Bacon & Thomas, PLLC

(57) ABSTRACT

An apparatus for measuring and/or monitoring the flow of a medium to be measured, which is flowing through a measuring tube in the direction of the longitudinal axis of the measuring tube. The apparatus includes: A magnet arrangement which produces a magnetic field passing through the measuring tube and running essentially transversely to the longitudinal axis of the measuring tube; two measuring electrodes which are galvanically or capacitively coupled with the medium to be measured and which are arranged in such a manner that a measurement voltage is induced in them, evoked by the medium to be measured; an evaluation control unit, which, on the basis of the measurement voltage induced in the measurement electrodes, provides information concerning the volume flow of the medium to be measured in the measuring tube; wherein connecting lines, or signal lines, as the case may be, are provided, by way of which the measurement signals are led between the measurement electrodes and the control/evaluation unit. In order to be able to arrange the signal lines in a space saving manner, the signal lines are arranged in an essentially planar structure.

13 Claims, 4 Drawing Sheets

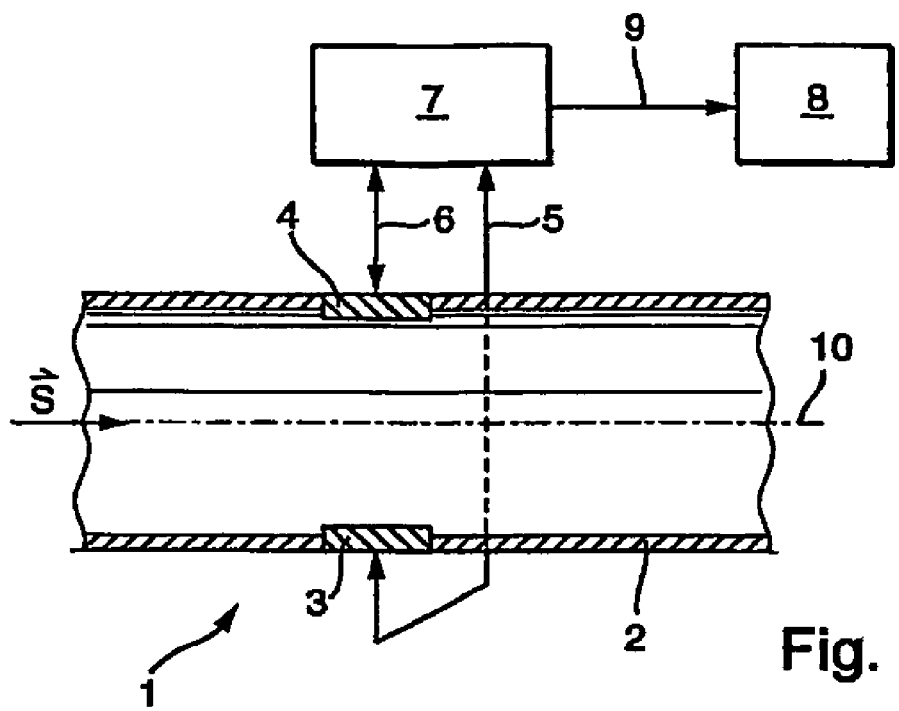
Fig. 1
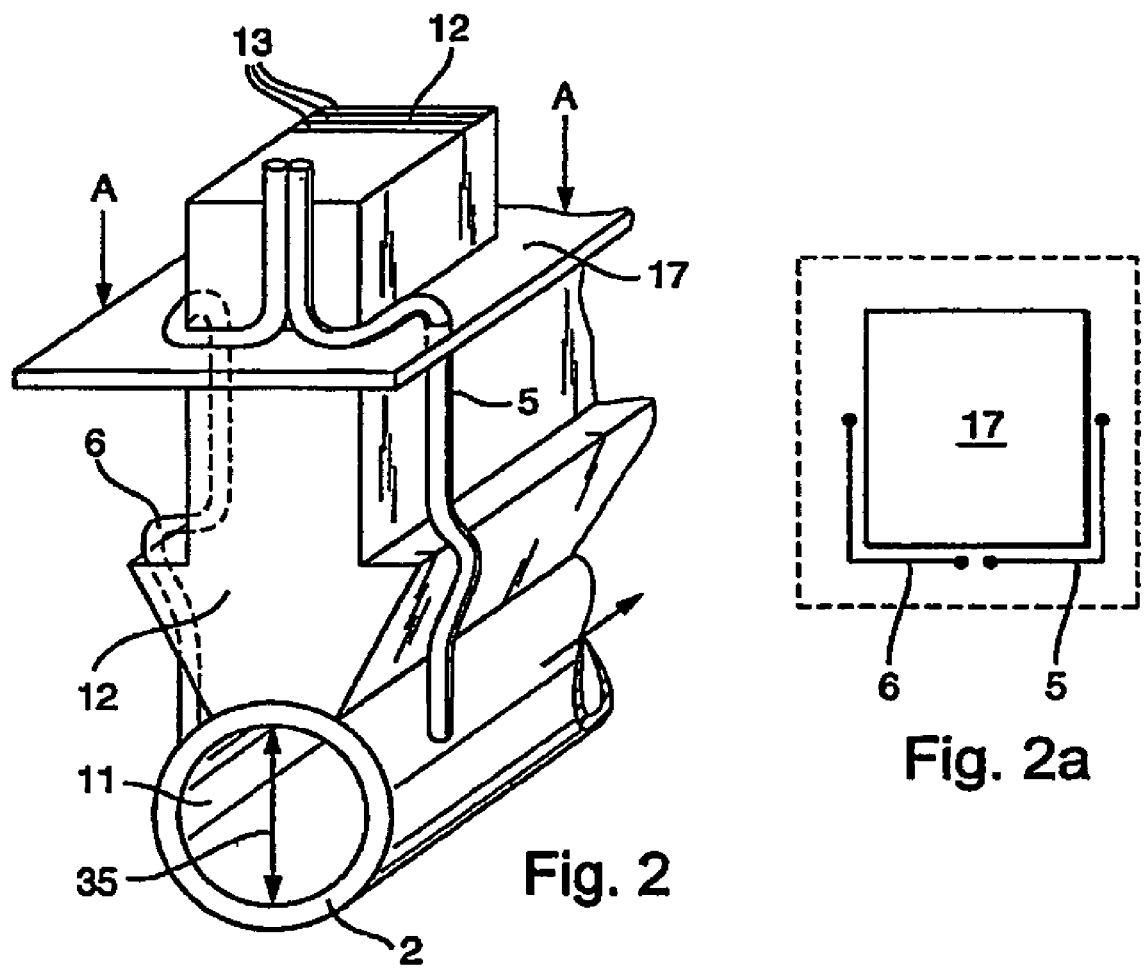
Fig. 2
Fig. 2a

APPARATUS FOR MEASURING AND/OR MONITORING FLOW OF A MEDIUM

The invention relates to an apparatus for measuring and/or monitoring the flow of a medium to be measured, which flows through a measuring tube in the direction of the longitudinal axis of the measuring tube.

BACKGROUND OF THE INVENTION

Magneto-inductive flow measuring devices use the principle of electrodynamic induction for the volumetric measurement of flow: Charge carriers of the medium moved perpendicularly to the magnetic field induce an induced voltage in measuring electrodes, which are likewise essentially perpendicular to the flow direction of the medium and, as well, perpendicular to the magnetic field. This voltage induced in the measuring electrodes is proportional to the flow velocity of the medium averaged over the cross section of the tube; it is thus proportional to the volume flow rate.

SUMMARY OF THE INVENTION

An object of the invention is, among other things, to lead the signal lines of a magneto-inductive measuring device in a space saving manner from the measuring electrodes to the transmitter.

An object of the invention is, among other things, to lead signal lines of a magneto-inductive measuring device in a space saving manner from the measuring electrodes to the transmitter.

Especially is the solution of the invention suited for integrating signal lines into a flexprint in connection with magneto-inductive measuring devices of small nominal diameters. By way of example, magneto-inductive measuring devices for batch operation are to be noted here, such as are sold by the assignee under the mark DOSIMAG. The commonly used signal lines are electrode cable, which are led from the measuring electrodes around one of the two coil arrangements in the direction of the transmitter and there soldered, or electrically contacted, as the case may be.

Such an arrangement is not quite without problems for the following reasons. Due to the leading of the two electrode cables around the coil arrangement, the area covered between the two electrode cables over a rather large distance is relatively great. There is then an increased danger that disturbing magnetic field lines will pass through the covered area and in this way induce interference currents in the electrode cable. These disturbing currents superimpose on the actual measurement current which leads to an increased inaccuracy in the measuring of the magneto-inductive flow measuring device. Also not quite problem free is the solution known from the state of the art to the extent that, because of design constraints, an area is covered between the electrode cables, which is perpendicular to the magnetic field produced by the magnetic arrangement. Also for this reason, disturbance currents can be induced in the electrode cables and have a negative effect on the accuracy of measurement.

By integrating the signal lines in the flexprint and by the resulting exact positioning of the signal lines in the region between the measuring electrodes and the transmitter, a very symmetric and defined leading of the lines can be realized. Both aspects are, with reference to accuracy of measurement, of considerable importance, since, with a leading of the lines which remains the same and is defined for all manufactured magneto-inductive measuring devices, then suitable countermeasures can be used for canceling disturbance currents from the coil circuit of the magnetic arrangement. A further advantage of the embodiment of the apparatus of the invention as flexprint is to be seen in the space saving leading of the lines between the measuring electrodes and the transmitter. Especially to be emphasized in this connection is the placing of the flexprint in place of a pole shoe lamella in a pole shoe. As already indicated, this embodiment is especially advantageous in the case of magneto-inductive measuring devices of small nominal diameters. Furthermore, by the embodiment of the invention, the mounting of a magneto-inductive measuring device is considerably simplified. That saves time and costs.

According to an advantageous further development of the apparatus of the invention, the signal lines are arranged on one side of the carrier material, symmetrically to the longitudinal axis of the carrier material, with the longitudinal axis being directed essentially parallel to the principal axis of the magnetic field. Additionally, the signal lines are so arranged on the carrier material that the area between the signal lines is minimal. By these measures, it is largely possible to prevent that electrical currents are induced in the signal lines due to disturbances from the coil circuit of the magnet field arrangement.

An advantageous embodiment of the apparatus of the invention provides that each magnet arrangement includes a pole shoe with the pole shoe being constructed of a plurality of pole shoe lamellae. In this connection, it is viewed as especially favorable when the signal lines or the carrier material carrying the signal lines are, or is, as the case may be, arranged in one of the two pole shoes.

Preferably, the carrier material on which the signal lines are provided has the form of a pole shoe lamella; this planar structure is inserted into the pole shoe in place of the centrally arranged pole shoe lamella. As already mentioned above, this form of embodiment permits a very space saving leading of the signal lines from the measuring electrodes toward the transmitter. The connection of the signal lines arranged on the flexprint, i.e. on the carrier material, with the transmitter is done, for example, by soldering or by mechanical clamping. Moreover, further provided on the carrier material are essentially planar, electronic components which can serve, among other things, for effectively compensating or neutralizing remaining inductive in-coupling outside of the flexprint. Since these remaining in-couplings are optimally known due to the known and defined leading of the signal lines, they can be effectively canceled.

In an advantageous embodiment of the apparatus of the invention, a mechanical coding is provided on the carrier material. This is so designed that the danger of a wrong connecting of the signal lines by switching of their polarities during manufacture and assembly of the pole shoe is minimized.

BRIEF DESCRIPTION OF THE DRAWINGS

The invention will now be explained in further detail on the basis of the appended drawings, the figures of which show as follows:

FIG. 1 a schematic drawing of a magneto-inductive flow measuring device;

FIG. 2 a perspective drawing of a leading of the signal lines known from the state of the art, between the measuring electrodes and the transmitter, in the case of a magneto-inductive flow measuring device;

FIG. 2A a top view onto the pole shoe according to the arrow A in FIG. 2;

DESCRIPTION OF THE PREFERRED EMBODIMENTS

Figure 3:
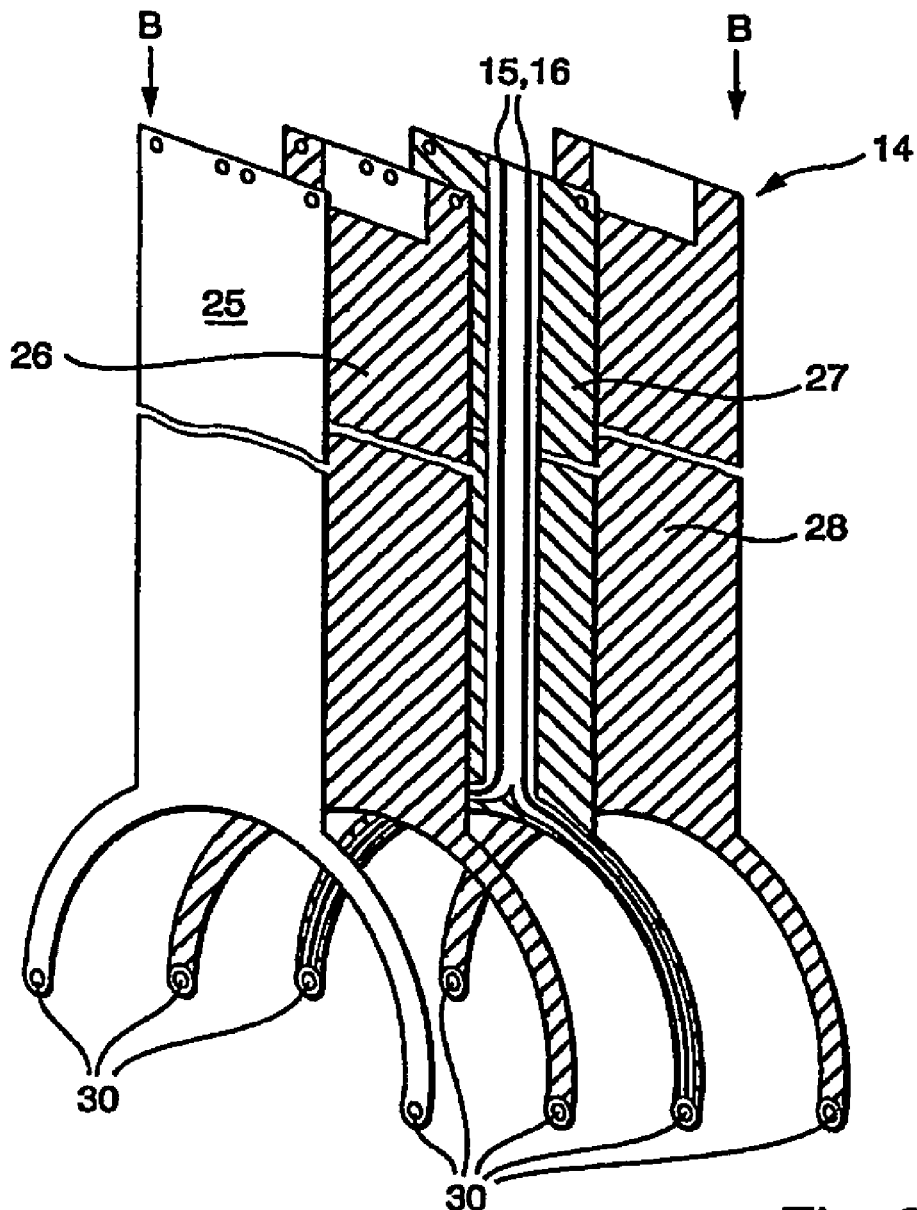
FIG. 3 an exploded drawing of a first embodiment of the arrangement, according to the invention, of the signal lines in a flexprint.

The apparatus includes: A magnet arrangement, which produces a magnetic field passing through the measuring tube and directed essentially transversely to the longitudinal axis of the measuring tube; two measuring electrodes, which are galvanically or capacitively coupled with the medium to be measured and which are arranged in such a manner that a measured voltage is induced in them, evoked by the medium to be measured; and an evaluation/control unit, which provides, on the basis of the voltage induced in the measuring electrodes, information concerning the volume flow of the medium in the measuring tube; wherein signal lines are provided via which the measured signals are conveyed between the measuring electrodes and the control/evaluation unit.

FIG. 1 shows a schematic drawing of a magneto-inductive flow measuring device 1 known from the state of the art. The measuring tube 2 of the flow measuring device (not separately shown in the drawing) contains a medium to be measured (likewise not separately shown) going through it in the direction of the measuring tube axis 10. The medium to be measured is at least slightly electrically conductive. Measuring tube 2 itself is manufactured of a nonconductive material, or, at least, it is internally coated with a nonconductive material.

As a result of a magnetic field directed perpendicularly to the flow direction of the medium to be measured and produced usually by two diametrically arranged electromagnets (which are likewise not shown in the drawing). Charge carriers located in the medium to be measured migrate to the oppositely poled, measuring electrodes 3, 4. The voltage arising between the two measuring electrodes 3, 4 is proportional to the flow velocity of the medium to be measured, averaged over the cross section of the measuring tube 2; i.e., it is a measure for the volume flow rate of the medium to be measured in the measuring tube 2. It is to be noted also that measuring tube 2 is connected via connecting elements (not separately shown in the drawing) with a pipeline through which the medium to be measured is flowing.

Via the signal lines 5, 6, the measuring electrodes 3, 4 are connected with the control/evaluation unit 7. Via the connecting line 9, moreover, measured data can be forwarded to the display unit 8.

FIGS. 2 and 2A show the leading of the electrode cables between the measuring electrodes 3, 4 and the transmitter compromised at least of the control-evaluation unit 7. The electrode cables leading away from the measuring electrodes 3, 4 run on opposite, lateral surfaces of the pole shoe 12. The opposite pole shoe of the magnet arrangement is not separately shown in FIG. 2. Pole shoe 12 is composed preferably of a plurality of assembled pole shoe lamellae 13. The layered construction of the pole shoe 12 suppresses eddy currents. In the region of the virtual surface 17, the electrode cables 5, 6 exhibit a change in direction. This is well illustrated in FIG. 2A, which shows a top view onto the virtual surface 12. The area between the two electrode cables 5, 6 in this region is oriented perpendicular to the magnetic field produced by the magnet arrangement. In this region, the danger that disturbance currents might be induced in the electrode cables 5, 6 is especially great.

Figure 4:
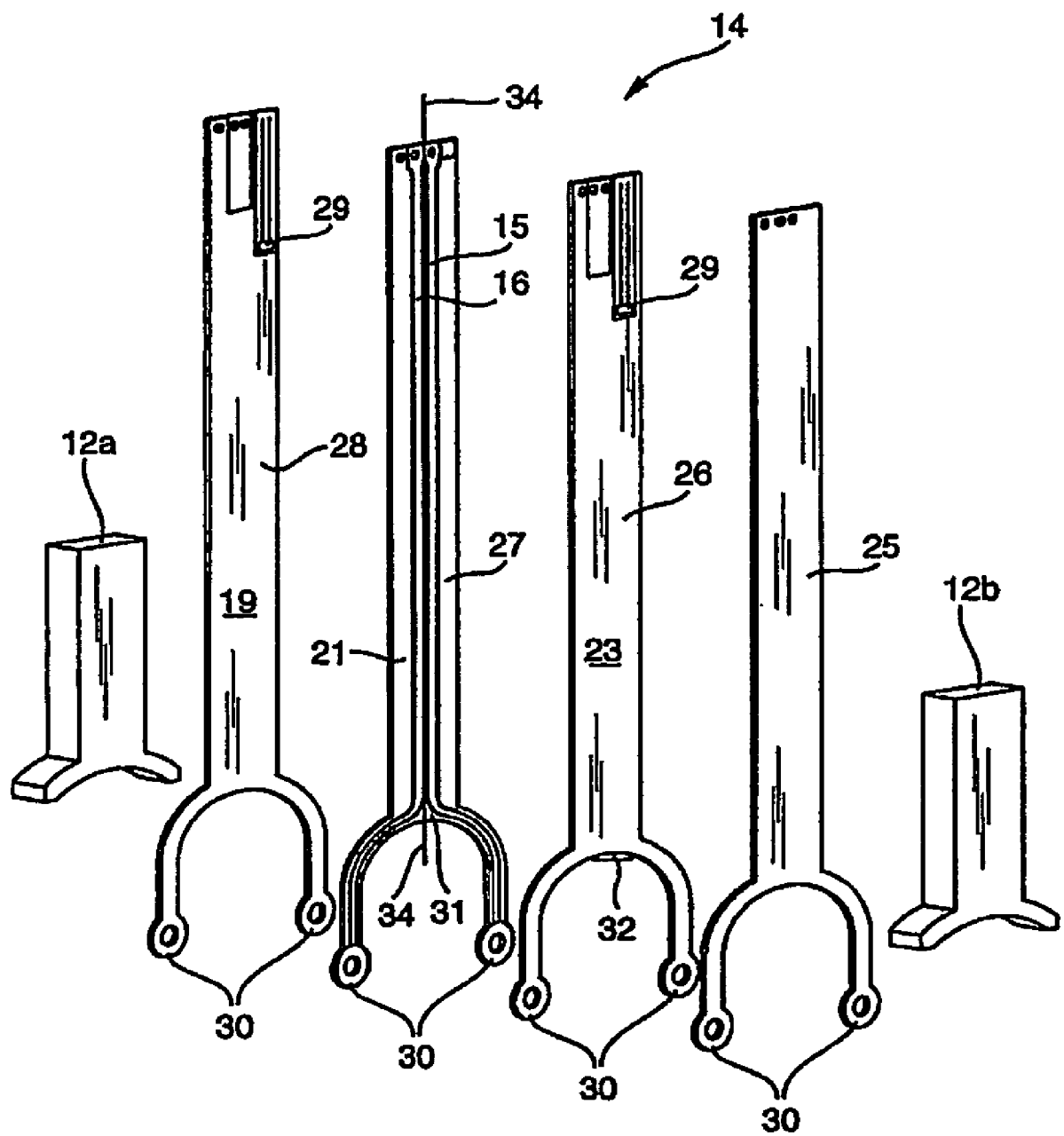
FIG. 4 an exploded drawing of a second embodiment of the flexprint of the invention.

FIGS. 3 and 4 show, in each case, exploded drawings of embodiments of the arrangement of the signal lines 15, 16 according to the invention in a layer structure integrated, in the illustrated case, into a flexprint 14. Flexprint 14 replaces in such case, as can be seen especially in FIG. 5, one of the pole shoe lamellae 13 of the pole shoe 12. Preferably, the replaced pole shoe lamella 13 is a pole shoe lamella 13 situated in the middle.

In the illustrated case, the signal lines 15, 16 are applied onto the carrier layer 27, or they are etched from a conductive coating of the carrier layer 27. Carrier layer 27 is preferably a flexible carrier layer 27. The flexible carrier layer 27 has, like the other layers 25, 26, 28 of the planar carrier structure, in the region of the pole shoe 13 essentially the form of a pole shoe lamella 13.

The two signal lines 15, 16 are symmetrically and, in high measure, definedly arranged about the longitudinal axis 34 of the flexible carrier layer 27. Over long distances, the two signal lines 15, 16 are arranged tightly next to one another. In this way, the area between the two signal lines 15, 16, particularly that which is perpendicular to the time-varying magnetic field, is minimized. On the other hand, the flexprint 14 in the form of pole shoe lamella 13, because of its planar structure, disturbs the functioning of the pole shoe 12 relatively little.

Figure 3A:
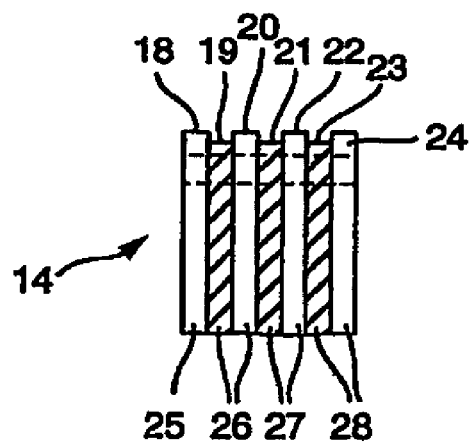
FIG. 3A a top view onto the embodiment shown in FIG. 3 according to the arrow B in FIG. 3.

FIG. 3A shows the layered construction of the preferred embodiment shown in FIG. 3 of the flexprint 14 of the invention. Flexprint 14 is composed of four layers, which are described from the left to the right: a first insulating layer 25, a first shielding layer 26, a carrier layer 27 carrying the signal lines 15, 16, and a second shielding layer 28. The insulating layer 25 is manufactured of an insulating material. The first shielding layer 26 is on the lateral surface 19, which faces the insulating layer 25 provided, with a conductive coating. The other lateral surface 20 of the first shielding layer 26 is electrically insulating. On the lateral surface 21 of the carrier layer 27, signal lines 15, 16 are arranged. The second lateral surface 22 of the carrier layer 27 is insulating. In the case of the second shielding layer 28, the lateral surface 23 facing the insulating lateral surface 22 of the carrier layer 27 is provided with a conductive coating. The outer surface 24 of the second shielding layer 28 is embodied in the form of an insulating layer. The purpose of the first and second shielding layers 26, 28 is to protect the signal lines 15, 16 from disturbing electric fields.

An essential advantage of using the flexprint 14 instead of the electrode cable used in the state of the art is to be seen in the fact that a wrong connecting of the signal lines 15, 16 by switching of their polarities during assembly of the flow measuring device 1 is essentially excluded. In order to switch the signal lines 15, 16, the portion of the flexprint 14 extending out of the pole shoe would have to be twisted 180 degrees.

The flexprint 14 of FIG. 4 differs from that shown in FIG. 3 only in a few details. On the carrier layer 27 and on the first shielding layer 26 respectively, a cutout 31 and a tongue 32 are provided, which assume the function of a mechanical coding. In this way, it is assured that the flexprint 14 is correctly assembled.

In FIG. 4 on a lateral surface of the layer 26 and on a lateral surface of the layer 28, in each case an electronic component 29 is arranged. These electronic components can, among other things, serve, as already indicated above, for the compensating of remaining disturbance in-couplings.

Figure 5:
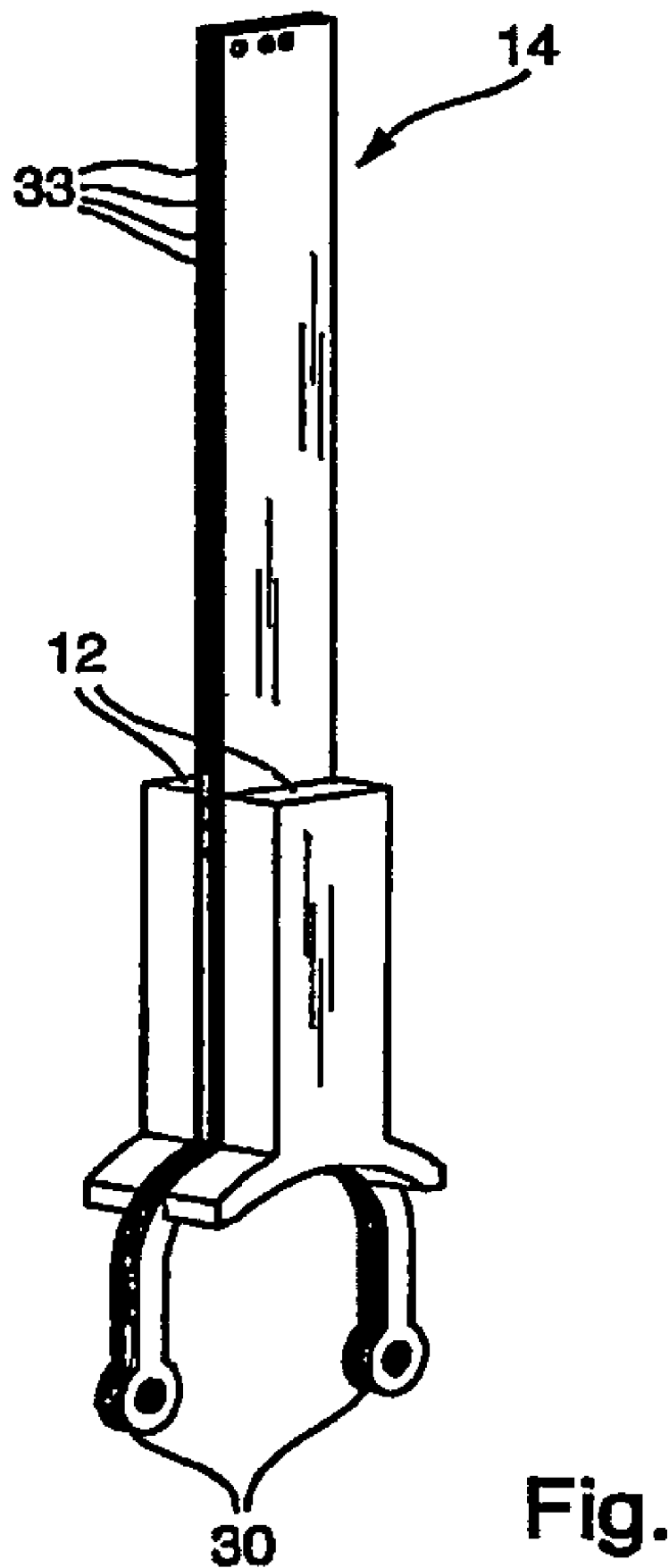
FIG. 5 a perspective view of a pole shoe of the invention with integrated flexprint.

FIG. 5 shows the arrangement of the signal lines 15, 16 according to the invention in a flexprint 14, which is integrated into a pole shoe 12. Flexprint 14 is so arranged in the pole shoe 12 that it, in effect, replaces the middle pole shoe lamella. The part of the flexprint 14 extending below beyond the pole shoe 12 carries the connecting rings 30 for the measuring electrodes 3, 4. The part of the flexprint 14 extending above has, in the upper region, taps 33 for the electrical connection to the transmitter, or to the control/evaluation unit 7, as the case may be.

The solution of the invention distinguishes itself by a compact, modular construction, whereby the complexity of assembly can be significantly reduced, especially for a magneto-inductive flow measuring device. Furthermore, a wrong connecting of the measuring electrodes 3, 4 by switching of their polarities is excluded with a probability bordering on certainty. Due to the defined, symmetric leading of the signal lines 15, 16 made possible by the planar structure, the influence of undesired induced currents is reduced to a minimum level. Remaining residual currents can be targeted for elimination by the introduction of corresponding electronic components.

The invention claimed is:

1. An apparatus for measuring and/or monitoring the flow of a medium to be measured, flowing through a measuring tube in the direction of the longitudinal axis of the measuring tube, comprising:
   - a magnet arrangement which produces a magnetic field passing through the measuring tube and running essentially transversely to the longitudinal axis of the measuring tube;
   - two measuring electrodes which are galvanically or capacitively coupled with the medium to be measured and arranged in such a manner that a measurement voltage is induced in them, evoked by the medium to be measured;
   - an evaluation/control unit, which, on the basis of the measurement voltage induced in said measuring electrode, or measuring electrodes, provides information concerning the volume flow of the medium to be measured, in the measuring tube;
   - connecting lines or signal lines by way of which measurement signals are led between said measuring electrodes and said control/evaluation unit, wherein:
   - said signal lines are arranged essentially in a planar structure.

2. The apparatus as claimed in claim 1, further comprising: carrier material, wherein:
   said signal lines are applied to said carrier material.

3. The apparatus as claimed in claim 2, wherein:
   said carrier material is flexible and said planar structure comprises a flexprint.

4. The apparatus as claimed in claim 2, wherein:
   said signal lines are arranged on a lateral surface of said flexible carrier layer and symmetrically to the longitudinal axis of said flexible carrier layer; and the longitudinal axis is arranged essentially parallel to the principle axis of the magnetic field.

5. The apparatus as claimed in claim 2, wherein:
   said signal lines are so arranged on said carrier material, or on said flexible carrier layer, as the case may be, that the area between said signal lines is minimal.

6. The apparatus as claimed in claim 1, wherein:
   said magnet arrangement includes at least one pole shoe; and
   each pole shoe is composed of a plurality of pole shoe lamellae.

7. The apparatus as claimed in claim 6, wherein:
   said carrier material, or said flexible carrier layer, as the case may be, is integrated with said signal lines into one of two pole shoes.

8. The apparatus as claimed in claim 2, wherein:
   said carrier material, or said flexible layer, on which said signal lines are provided, has, at least in a subsection, the form of a pole shoe lamella; and
   the corresponding planar structure is joined into the pole shoe in the place of the pole shoe lamella arranged in the middle.

9. The apparatus as claimed in claim 1, further comprising:
   at least one essentially planar electronic component on said planar structure.

10. The apparatus as claimed in claim 2, further comprising:
    mechanical coding is provided on said carrier material or on said planar structure.

11. An arrangement for leading signal lines and/or connecting lines in a pole shoe of a magnet arrangement, the magnet arrangement preferably is a part of a magneto-inductive flow measuring device, comprising a plurality of planar layers, wherein:
    at least one of said plurality of planar layers carries essentially planar signal lines and/or connecting lines and is inserted into the pole shoe in place of at least one pole shoe lamella.

12. The arrangement as claimed in claim 11, wherein:
    said signal lines are applied onto at least one of said planar layers.

13. The arrangement as claimed in claim 11, wherein:,
    said plurality of planar layers are flexible layers.

* * * * *